Dec. 23, 1969     O. E. ALBERTSON     3,485,750

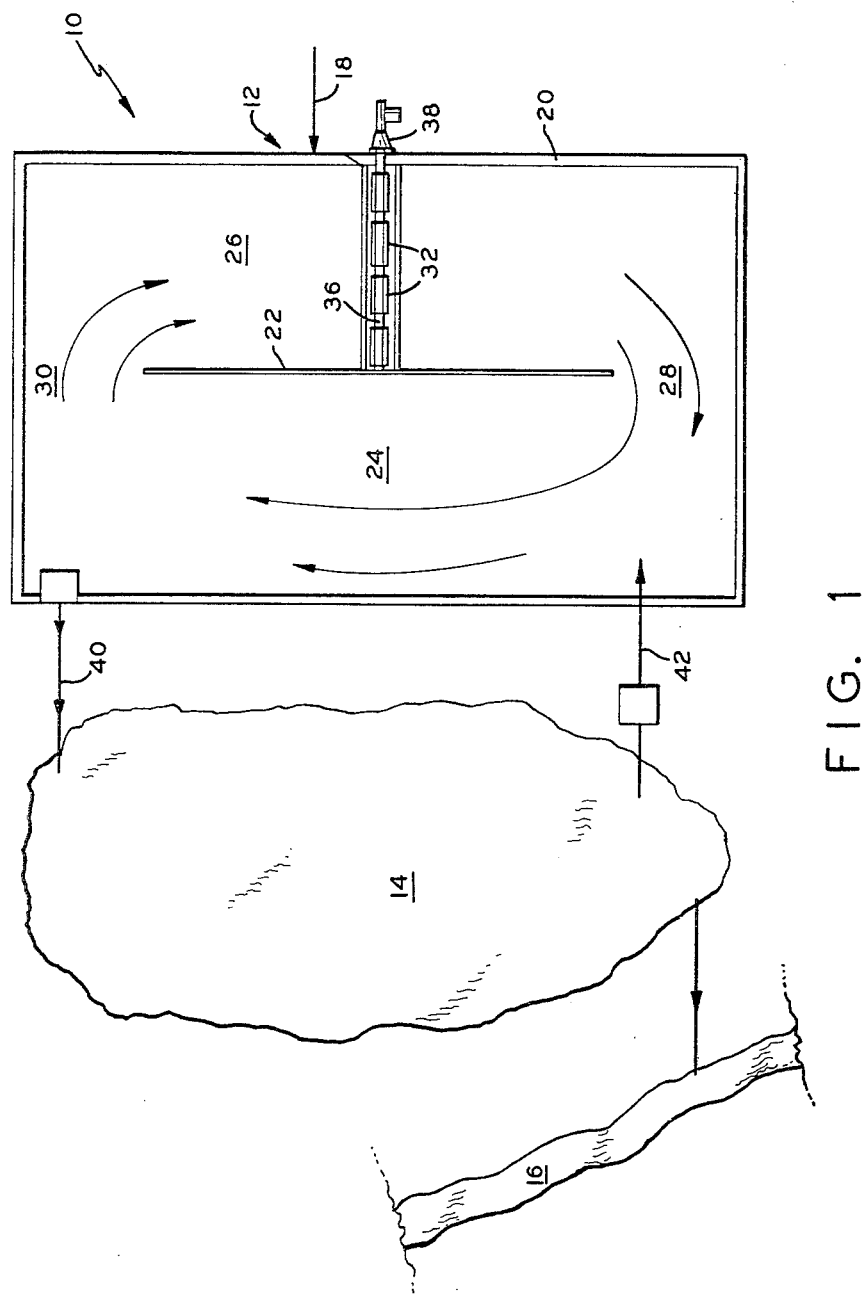

AERATED LAGOON WASTE TREATMENT SYSTEM

Filed Oct. 25, 1967     2 Sheets-Sheet 2

INVENTOR.
ORRIS E. ALBERTSON
BY *Arnold Grant*
ATTORNEY.

United States Patent Office 3,485,750
Patented Dec. 23, 1969

3,485,750
AERATED LAGOON WASTE TREATMENT SYSTEM
Orris E. Albertson, Norwalk, Conn., assignor to Dorr-Oliver Incorporated, Stamford, Conn., a corporation of Delaware
Filed Oct. 25, 1967, Ser. No. 677,938
Int. Cl. C02c 5/10, 5/04, 1/02
U.S. Cl. 210—8                                    5 Claims

ABSTRACT OF THE DISCLOSURE

A process for treating industrial and domestic waste, either with or without pretreatment, by aerating in a lagoon, transferring the product to a polishing pond or tank, recirculating at least a portion of the pond or tank effluent back to the lagoon and recirculating at least a portion of the pond or tank underflow back to the polishing pond.

---

Heretofore, the BOD content of industrial and domestic waste products was reduced by either of three methods: aerobicly, preferably by the activated sludge process, anaerobic decomposition of the biological cellular forms, or treatment in an oxidation or stabilization pond. This latter process while the least expensive from an operating and maintenance standpoint, has several disadvantages in that the large tracts of land required for the ponds are becoming increasingly difficult to procure, there is a possible odor problem and unfavorable climatic conditions adversely affect the operating efficiency of the system.

Recently, however, a process has been developed which incorporates all of the advantages of a stabilization pond without any of the corresponding size, odor and climatic dependence liabilities. This new system is based on the relationship between the land area and the oxidation rate of stabilization ponds, i.e., the more surface area in the pond the more contact between the liquid to be treated and the oxygen-containing atmosphere. However, instead of increasing the surface area of the pond in order to correspondingly increase the oxidation rate, this process increases the supply of oxygen to the treated liquid by circulating the liquid through a combination aerating-mixing device incorporated into the pond. Thus, the size of the pond can be drastically reduced often by as much as 90%, because the oxygen transfer mechanism is no longer dependent on the size of the pond or the prevailing climatic conditions, but on the oxygen transfer efficiency of the aeration-mixer.

Analysis of this aerated lagoon has shown that the mechanism of oxygen transfer is due primarily to the phenomena of surface re-aeration, i.e., oxygen drawn from the atmosphere immediately adjacent the liquid surface so that the cost of aeration is minimized relative to the degree of oxygen transferred. In the quiescent environment of a stabilization pond the surface layers of the liquid become saturated with dissolved oxygen and function as an insulator to prevent further oxygen transfer to the lower portion of the pond. An aerated lagoon, on the other hand, maintains the treated liquid in a pronounced state of turbulence, constantly circulating the liquid around the lagoon and pumping unsaturated liquid to the liquid-atmosphere interface. Thus, with the aeration device serving more as a source of turbulence than a source of oxygen, interchange between the atmosphere and the entire liquid body is maximized.

Under the aerobic conditions of the lagoon, the bacteria in the waste products metabolize the soluble and colloidal BOD into settleable solids or flocs. It has been found that the major portion of the BOD remaining is contained in the unoxidized solids generated from the raw BOD of the waste. More specifically, it has been found that the efficiency of an aeration lagoon is dependent, to a large extent, on whether these solids are removed from the effluent. Thus, in the majority of installations, the BOD removal efficiency of the lagoon is enhanced by combining it into a treatment system which incorporates a secondary treatment or a polishing pond, downstream from the lagoon, to receive the aerated effluent and settle the biological flocs.

Although this system has been widely acclaimed one particular problem has remained to limit its commercial feasibility. As is well known, the warmer seasons of the year, particularly in the more southern climates, have a disproportionate effect on the rate of biological growth and the corresponding oxygen demand of the treatment system. This increased demand, which creates shock loading problems by itself, is often coupled with seasonal peaks from industrial sources of waste. The problem then, is how to size the system. Should capacity be in terms of maximum loading conditions, which increases operating costs during non-peak periods, or should a means be struck between summer and winter, with reduced efficiency at peak BOD loadings.

It is, therefore, an object of the present invention to maximize the shock loading capacity of an aerated lagoon treatment system without increasing the size of the system. Applicant has found that by controlled recirculation of the secondary treatment effluent back to the aeration lagoon the short term BOD loading capacity of the system is increased to the point where shock loads of from 3–7 days duration can be accommodated without substantial deterioration of the final effluent.

The volume of the polishing pond is generally a function of the detection time necessary to settle the low concentration of solids present in the aerated lagoon effluent; usually on the order of two days liquid detention. If available land is a problem, the precipitation time can, to an extent, be decreased by the addition of artificial coagulants, such as alum, or a polyelectrolyte, to induce flocculation.

Aerobic reduction of BOD requires that a definite amount of phosphorus and nitrogen be present in the system, either as a biochemical part of the incoming waste stream or as an additive to the system, in order for the bacteria to metabolize the organic matter into carbon dioxide, water and inert residual material. Certain industrial wastes, however, most notably the residues of the canning, starch and paper industries, are so deficient in these nutrients that large and, at times prohibitively expensive dosages of phosphorus and nitrogen generating chemicals must be continuously added to the treatment system to sustain cellular life.

It is therefore another object of the present invention to substantially reduce the quantity of nutrients externally added to an aerobic digestion system to maintain sustained BOD removal from phosphorus and nitrogen deficient organic waste material. It has been observed that during the bacterial growth phase of the aerobic system the biological cells consume the nitrogen and phosphorus nutrients to maintain continued cell growth. It is also known that as these cells reach equilibrium and enter the "die-away" stage they return these nutrients to the liquor. However, the time required for the nutrients' return is several times that required for BOD removal, and, as a result, it is only practical to consider the volume of the aerated lagoon in terms of BOD removal. Thus, there is only a minimal return of nutrients to the liquid in the aerated lagoon.

The problem, then, becomes one of regenerating these lost nutrients and returning them to the aeration portion of the system. As stated above, the upper layers of a quiescent stabilization pond become saturated with dissolved oxygen and, as a result, function in the capacity of an oxygen insulator to prevent any oxygen transfer to the lower reaches of the pond. If a polishing pond is used as the source of secondary treatment for the aerobic biological floc structures generated in the aeration lagoon, they settle into this oxygen-deficient atmosphere where they are then decomposed by anaerobic digestion. This self-destruction, in turn, releases the nutrient compounds of ammonia and phosphate phosphorus from the sludge and returns them into solution in the effluent. Thus, applicant found that by recycling a portion of the polishing pond effluent back to the aerated lagoon, the system will continuously reuse its own supply of nutrients. In this manner, often as much as 70% of the nutrients necessary to maintain aerobic cell growth in a nutrient-poor waste treatment system can be generated by the system itself, making it less dependent on additive chemicals and considerably less expensive to operate. In addition, applicant has found that recycling of the polishing pond effluent further enhances BOD removal because the oxygen generated by the algae in the polishing pond can now be utilized in the aerated lagoon which substantially reduces the oxygen-generating horsepower requirements of the aerator in the lagoon.

It is therefore still another object of the present invention to recirculate a portion of the secondary treatment effluent back to the aerated lagoon of a waste treatment system.

It is yet another object of the present invention to control the recirculation rate between the secondary treatment and the aerated lagoon of a waste treatment system to accommodate shock hydraulic and organic loading of the aerated lagoon.

The subject matter which applicant regards as his invention is particularly pointed out and distinctly claimed in the concluding portion of this specification. The inventon, however, as to its organization and method of operation, together with further objects and advantages thereof, will best be understood by reference to the following description taken in conjunction with the accompanying drawings, in which:

FIGURE 1 diagrammatically depicts, in plan, applicant's waste treatment system comprising an aeration lagoon having an aeration pumping source, a polishing pond and a receiving stream;

Figure 3:
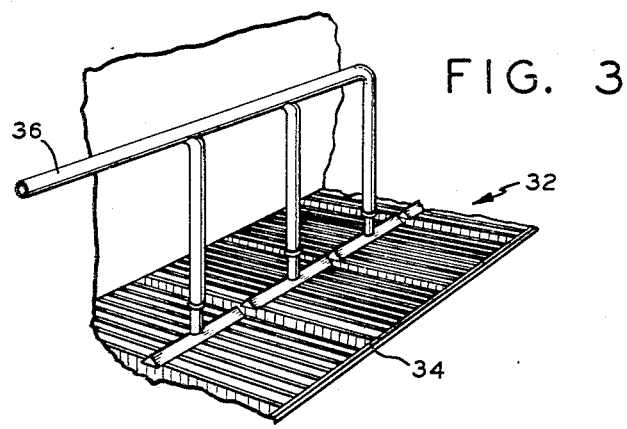
FIGURE 3 is a perspective view, with parts removed for clarity of showing, of a series of aeration devices that can be incorporated into the aeration lagoon of the present invention.
Figure 2:
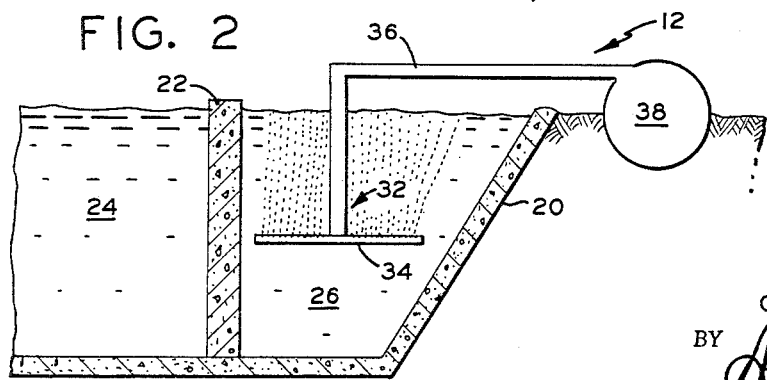
FIGURE 2 is an end view in section of an aerating lagoon having only one aerator.

Referring now to FIGURES 1-3, applicant's waste treatment system 10 comprises an aeration lagoon 12, a polishing pond 14 and a receiving stream 16. Waste material, which preferably has received primary treatment to remove the more readily settled components thereof, but which may be in the "raw" state, is received into the system 10 and the lagoon 12 through inlet 18. Lagoon 12 is an elongated excavation having an optimum depth of between 3 and 6 feet, and sloping side walls, or levees, 20. An upstanding baffle 22 extends in a longitudinal direction, substantially the full length of the lagoon, to divide it into an upstream channel 24, a downstream channel 26 and two end channels, 28, 30. A series of aerating devices 32, which will be described in greater detail below, are submerged in the liquid at a depth of from 2 to 4 feet and extend transversely across the downstream channel 26 from the baffle 22 to the levee 20.

It should be understood at this juncture that while only one such lagoon is shown and described, applicant's invention encompasses a series of such lagoons in side-by-side array. It should be equally understood that baffle 22 may be disposed in any angular configuration relative to the side and end walls of the lagoon and that any number of aerating devices 32 may be used.

Aerators 32 are preferably of the "Inka" type, having an air diffusing grid 34, a central feed pipe 36 and a low pressure source of air 38. The aerators should be considered more of a pump-mixer than a source of oxygen because their primary function is to pump the liquid through the channels of the lagoon and to constantly churn the liquid into a turbulent river so that maximum benefit can be derived from the surface reaeration phenomenon. Studies of quiescent stabilization ponds have shown that when the surface layer of liquid becomes saturated with dissolved oxygen it functions as an insulator to prevent further oxygen transfer to the lower levels of the pond. However, high rate recirculation of the liquid and the pronounced state of flux maintained by transfer through the aerator 32 forces the bottom and top layers of the liquid to constantly interchange with each other. As a result, the unsaturation liquid is brought into contact with the atmosphere to absorb oxygen, and saturated liquid is forced to the bottom to fully disperse the dissolved oxygen throughout the lagoon. Test runs with a one grid, 300–500 s.c.f.m. "Inka" type aerator in a ⅓ acre lagoon having a water depth of 3½–4 feet have demonstrated that with a total oxygen uptake rate of 8 mg./1/hr. for the lagoon, not more than 1.5 mg./1/hr. of oxygen was supplied at the grid. The balance was contributed by surface reaeration due to the turbulent artifical "river" produced by the pumping action of the "Inka" grid. It should also be noted that it was possible to load this unit up to 500 lbs. BOD/day, rather than less than 50 lbs. BOD/day for an equivalent stabilization pond.

The influent from inlet 18 joins the recirculaed liquid already moving downstream in channel 26 and is areated by being passed through the submerged grid 34 of aecator 32. Theoretically, all other conditions being met, once the dissolved oxygen level in the liquid in sufficient to sustain an aerobic environment, the bacteria in the waste products will metabolize the soluble and colloidal BOD into settleable solids or biological flocs. These flocs if left alone will then settle to the bottom of the lagoon where they will undergo further biological decomposition until the metabolization process is complete.

It has, however, been observed that the efficiency of aeration lagoons depends to a large extent on whether or not these precipitated flocs are removed from the lagoon. More specifically, it has been found that the efficiency of the lagoon will vary as a function the time allowed to oxidize the non-settleable aerobic cells. Applicant, thus, as part of this invention maximizes lagoon efficiency by discharging the aerated product to a secondary treatment area, denoted in FIGURE 1 by a polishing pond 14.

The polishing pond 14 functions as a quiescent environment to receive the aeration lagoon product and settle out the precipitated biological flocs. Because of its relatively small size, between ⅛ and ½ the volume of the aeration lagoon, and because the majority of the BOD has already been removed, the pond 14 is not subject to any of the size, odor or climatic limitations normally associated with stabilization ponds.

Although this system is essentially different from both a stabilization pond and an activated sludge process, it is still subject to climatic-oriented shock loadings. Increases in the temperature of the surrounding atmospher and/or ground water have a multiplying effect on the BOD loading of the waste treatment system. This sudden shift in BOD can reach severe proportions, especially when, as in many communities, it coincides with increased hydraulic and BOD output from industrial waste sources. Heretofore, the problem has been how to optimumly size the system, i.e., somewhere between what can be considered normal operating conditions and the peak loadings, or at one of the extremes.

Applicant's system obviates this problem by a two-fold approach; first, by utilizing the secondary treatment area as a shock loading basin to accommodate the influent overflow from the aerated lagoon; and, second, by controllably recirculating a portion of the effluent from the secondary treatment area back to the aerated lagoon. This treatment of the overload has been found sufficient to remove and digest enough BOD from the system influent to maintain an aerobic environment in the aerated lagoon. Valved conduit 40 adjustably controls the flow of aerated effluent and overflow system influent to the secondary treatment area and valved conduit 42 adjustably controls the flow of secondary treatment effluent back to the aerated lagoon. In this manner the system can accommodate shock loads of from 3-7 days duration by adjustably increasing or decreasing the rate of recirculation between the aeration lagoon and the secondary treatment area. It should be noted that this is without increasing the size of the system, without increasing power requirements and without any noticeable deterioration of the final effluent.

The volume of the secondary treatment area is generally a function of the detention time necessary to settle the low concentration of solids present in the aerated lagoon effluent. Since these solids do not readily flocculate, the usual approach is to provide a polishing pond having a detention time of approximately two days. If available land is a problem, the precipitation time can, to an extent, be improved by the addition of coagulants or a polyelectrolyte to the polishing pond effluent. However, these measures are usually found to be disproportionately expensive on a continuous operation basis.

As stated above, sustained aerobic decomposition of the BOD, all other conditions being met, depends on the maintenance of a minimum dissolved oxygen content in the treated liquid. Two of the most important "other conditions," just as critical as the dissolved oxygen content, are the levels of the phosphorous and nitrogen in the system. These chemicals which serve as nutrients for the biological cells must be present as a biochemical part of the incoming waste or as a chemical additive to the system in order for the bacteria to metabolize the organic matter into carbon dioxide, water and inert residual material. Certain industrial wastes, however, most notably those of the canning, starch and paper industries, are so deficient in these nutrients that uneconomically large doses of phosphorous and nitrogen generating chemicals must be continuously added to sustain cellular life. Whether these nutrients are already in the waste material or must be added to the system influent, it has been observed that as the biological cells reach equilibrium and enter into the "die-away" stage they return the nutrients to the liquor. However, the time required for the nutrients' return is several times that required for BOD removal, and, as a result, it is only practical to consider the volume of the aerated lagoon in terms of BOD removal. The problem then was how to regenerate these nutrients and return them to the aerated lagoon, especially in those systems where the phosphorus and nitrogen were supplied by chemical additives.

As stated above, once the surface layers of a stabilization pond become saturated with dissolved oxygen they insulate the lower layers from further oxygen transfer. Thus, when the biological flocs settle in the polishing pond 14 they enter into an oxygen-deficient environment and undergo anaerobic digestion. This self-decomposition process releases a substantial portion of the phosphorus and nitrogen from the flocs and returns them to solution in the effluent. In this manner, as much as 70% of the nutrient level required to sustain aerobic cell life in a nutrient poor treatment system can be generated by the system itself. In addition, continuous recycling of the polishing pond effluent further enhances BOD removal and reduces aerator horsepower because the oxygen generated by the algae in the polishing pond can be utilized in the aeration lagoon.

In summary, this invention provides an improved waste treatment system in the nature of an aerated lagoon combined with a quiescent polishing pond receiving the effluent from the aerating lagoon. The improved system is capable of handling substantial fluctuations in oxygen demand in the aerated lagoon caused by changes in BOD loading and/or temperature changes. This is accomplished by maintaining an aerobic condition in the aerated lagoon, as defined by an adequate dissolved-oxygen level, to permit the aerobic bacteria to metabolize the soluble and colloidal BOD into biologic flocs.

To accommodate these loading changes in terms of oxygen requirements in the aeration lagoon, the invention provides for controllably recirculating at least a portion of the treated effluent from the upper zone of the polishing pond back to the aerated lagoon, while decomposition of the settled flocs is effected anaerobically in the bottom zone.

Therefore, a loading increase due to temperature and/or BOD changes will be reflected in a decrease in the dissolved oxygen level, and vice versa. Accordingly, a decrease in dissolved oxygen level (i.e. greater oxygen demand) can be compensated by a corresponding increase in the recirculation rate, and vice versa.

It follows that the recirculation thus controlled will provide just sufficient detention time in the aerated lagoon to convert the soluble and colloidal BOD into biologic flocs, without consuming excessive oxygen supply and power, due to excessive detention time in the aeration lagoon. An increase in the recirculation rate shortens the floc detention time, and vice versa, while the raw feed displaces floc-laden liquid into—and through the quiescent polishing pond where the remainder of biologic decomposition is achieved economically by the anaerobic digestion of the flocs in the bottom zone.

A concurrent economic advantage in the operation of this invention is due to the fact that nutrients such as phosphate phosphorus and nitrogen released by the anaerobic digestion in the bottom zone of the polishing pond, are returned to the aerating lagoon by said recirculation, along with oxygen-producing algae, thus adding to the basic economy of this improved operation in terms of supplemental chemical nutrients and aerating horsepower.

Since this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are, therefore, intended to be embraced by those claims.

What I claim is:

1. The process of treating a liquid containing organic waste material, which comprises feeding the liquid into a first treatment pond containing phosphorus and nitrogen as nutrients in sufficient quantity for converting said organic material into biologic flocs in the presence of sufficient dissolved oxygen to maintain an aerobic condition in said treatment area;

impelling the liquid in said first treatment pond so as to maintain the same in a state of continuous movement in a closed horizontal path to encourage surface aeration;

forcibly aerating liquid in at least one transverse zone extending across said path, thereby maintaining a state of turbulence which adds and distributes dissolved oxygen in the liquid;

displacing the aerated floc-carrying liquid from said first treatment pond to a second horizontally adjacent separate treatment pond, by the feed entering the first pond;

maintaining said second treatment pond in a substantially quiescent state to allow the biologic flocs to settle as sludge, thus forming a sludge zone at the bottom subject to anaerobic digestion, and a superjacent liquor zone maintained in an aerobic state exposed to natural surface re-aeration, while anaerobic digestion releases ammonia nitrogen and phosphate phosphorus from said bottom zone into said superjacent zone;

and returning at a controllable rate at least a portion of the treated liquor from said superjacent zone along with its content of said released phosphorus and nitrogen to said first treatment pond, said rate of return being such as to vary the displacement of said flocs from the first pond into the second pond, so as to decrease their detention time in the first pond with increasing temperature of the liquid being treated, and to increase said detention time with decreasing temperature, thus utilizing the joint effect of said return of treated liquor, of said forced aeration and surface aeration in the first treatment area, of said surface re-aeration in the second treatment pond and of the returned nutrients, for maintaining floc-forming aerobic conditions in said first treatment area in terms of said dissolved oxygen content.

2. The process according to claim 1, wherein said forced aeration itself impels the liquid in said first pond to maintain said movement in said closed horizontal path.

3. The process according to claim 1, wherein said forced aeration is effected by the introduction of compressed air providing an impelling force by air lift effect, thereby maintaining said movement in said closed path.

4. The system for treating a liquid containing organic waste material which comprises
- a first treatment pond controlling a relatively shallow body of said liquid, and having feed inlet means and outlet means located functionally remote from said feed inlet means;
- vertical baffle means in said first pond, spaced from the surrounding boundaries of the pond so as to define therein an endless horizontal path surrounding said baffle means;
- means for impelling the liquid in said first pond, so as to maintain the liquid in a state of continuous movement along said closed path, to encourage surface aeration;
- means for forcibly aerating said liquid body in the first pond in a transverse zone extending across said path between said baffle means and said boundaries, which forced aeration adds and distributes dissolved oxygen in the liquid while also promoting surface aeration;
- a second treatment pond open to the atmosphere and horizontally adjacent to said first pond and having a transfer connection with the outlet means thereof, through which floc-carrying aerobically treated liquid is displaced by feed entering the first pond into the second pond, said second pond having overflow discharge means for the delivery of treated liquid, functionally remote from said transfer connection, said second pond being designed for quiescent detention of the liquid with surface re-aeration, while allowing the flocs to settle therein as sludge, thus forming a sludge zone at the bottom subject to anaerobic digestion and a superjacent liquor zone maintained in an aerobic state exposed to natural surface reaeration, while said anaerobic digestion releases ammonia nitrogen and phosphate phosphorus from said bottom zone into said superjacent zone;
- and means for returning at a controllable rate at least a portion of the treated liquor along with its content of phosphorus and nitrogen and dissolved oxygen from said superjacent zone to said fiirst treatment pond, said return means being operable to vary the displacement of said flocs from the first pond into the second pond, so as to decrease their detention time in the first pond with increasing temperature of the liquid being treated, and to increase said detention time with decreasing temperature, said liquor return, said surface aeration and forced aeration in the first treatment pond, and said surface re-aeration in the second treatment pond along with the return of said nutrients being jointly effective for maintaining aerobic floc-forming conditions in said first pond in terms of said dissolved oxygen content.

5. The system according to claim 4, wherein said oxygen supply means comprise submerged air diffuser means constructed and arranged to act as an air lift means providing the impelling force for moving the liquid in said endless path.

References Cited

UNITED STATES PATENTS

| 2,477,815 | 8/1949 | Mallory | 210—6 |
| 3,234,123 | 2/1966 | Hinde | 210—7 |
| 3,236,766 | 2/1966 | Levin | 210—15 |

OTHER REFERENCES

Walker, P.G.W., Rotor Aeration of Oxidation Ditches, Water and Sewage Works, June 1962, pp. 238–241.

MICHAEL E. ROGERS, Primary Examiner

U.S. Cl. X.R.

210—14, 195